United States Patent [19]

Marks et al.

[11] Patent Number: 5,514,211
[45] Date of Patent: May 7, 1996

[54] COMPOSITION FOR SURFACE TREATMENT

[75] Inventors: Geoffrey P. Marks, Banbury; William F. Marwick, Daventry, both of United Kingdom

[73] Assignee: Alcan International Limited, Canada

[21] Appl. No.: 395,179

[22] Filed: Feb. 27, 1995

Related U.S. Application Data

[63] Continuation of Ser. No. 108,738, filed as PCT/EP92/00403, Feb. 26, 1992, abandoned.

[30] Foreign Application Priority Data

Mar. 1, 1991 [GB] United Kingdom ............... 9104402

[51] Int. Cl.⁶ .................... C09D 5/00; C08K 5/05
[52] U.S. Cl. .................... 106/287.16; 427/384; 428/433; 428/449
[58] Field of Search ............... 106/287.16; 427/384; 428/447, 433

[56] References Cited

U.S. PATENT DOCUMENTS

| | | | |
|---|---|---|---|
| 4,019,558 | 8/1976 | Szabo | 164/26 |
| 4,506,052 | 3/1985 | Furukawa et al. | 524/357 |
| 5,192,603 | 3/1993 | Slater | 428/217 |
| 5,248,715 | 9/1993 | Gray et al. | 524/265 |
| 5,292,799 | 3/1994 | Naito et al. | 524/783 |

FOREIGN PATENT DOCUMENTS

| | | | |
|---|---|---|---|
| 64-30748 | 2/1989 | Japan . | |
| 02008273 | 1/1990 | Japan | 106/287.16 |
| 70776 | 3/1990 | Japan . | |
| 04198379 | 7/1992 | Japan | 106/287.16 |

*Primary Examiner*—David Brunsman
*Attorney, Agent, or Firm*—Cooper & Dunham

[57] ABSTRACT

An aqueous composition for the treatment of surfaces such as metals particularly aluminum, comprises a tetraalkyl silicate or a monomeric or oligomeric hydrolysis product thereof, and an inorganic passenger powder below 100 nm diameter such as fumed silica, both in dispersion in a fluid aqueous medium. The composition can be applied as a conversion coating to improve the adhesion of subsequently applied paint, lacquer or adhesive. Non-aqueous intermediate products comprising the silicate component and passenger powder can be diluted with water to make the coating composition.

12 Claims, No Drawings

COMPOSITION FOR SURFACE TREATMENT

This is a continuation of application Ser. No. 08/108,738, filed Sep. 20, 1993 now abandoned, which is an application filed under 35 U.S.C. §371 corresponding to PCT/EP92/00403 filed Feb. 26, 1992.

This invention relates to aqueous compositions for surface treatment. One purpose of the treatment is to increase the adhesion of subsequently applied coatings, such as paint, lacquer, varnish or adhesive. Although the invention is of application to solid surfaces generally, it is of major importance in relation to metals generally, and in particular to aluminium.

U.S. Pat. No. 3,706,603 describes a surface pretreatment comprising a passenger powder in an aqueous solution of chromium compounds. The composition is applied to a metal workpiece and dried in situ without washing; this is known as a no-rinse pretreatment. The composition is widely used under the Trademark Accomet C, but suffers from the disadvantage of its toxic chromium content.

Published European patent specification 358338 describes another aqueous composition for no-rinse pretreatment of metal surfaces. This comprises a passenger powder in an inorganic hydrous oxide sol which is gelled and cured to give the required coating.

Polydiethoxysiloxanes are used as refractory binders for metal casting moulds, and as binders for zinc-rich primers. They are made by the controlled hydrolysis of tetraethyl silicate to a 40% hydrolysed product known as "Ethyl Silicate 40" or "Silicate 40". This is a mixture of tetraethyl silicate and various polydiethoxysiloxane oligomers. These are generally used in solution in organic solvent; but such solvent necessarily carries a fire hazard.

JP 2070776 (Tokuama Soda) and EPA 241 158 (Nippon Telegraph and Telephone) describe solvent-based coating compositions containing polydialkyslloxanes and powders.

JP 64-30748 of Toyo Aluminium describes coating aluminium foil with an aqueous solution of tetraalkyl silicate containing a powder passenger. The powder particle size is of the order of 1–6 μm and the coating thickness is at least several μm, more typical of a primer or conversion coating than of a pretreatment.

U.S. Pat. No. 3,971,660 of Eastman Kodak describes coating lithographic printing sheets with an aqueous composition of a tetraalkyl silicate and polyvinyl acetate together with a pigment powder. The hydrolysed polyvinyl acetate would act as a humectant and thus make the composition unsuitable as a base for subsequently applied organic coatings such as paint, lacquer, varnish or adhesive.

In one aspect this invention provides a coating composition comprising a tetraalkyl silicate or a monomeric or oligomeric hydrolysis product thereof and an inorganic oxide passenger powder below 100 nm diameter, both in dispersion in a fluid aqueous medium.

In another aspect, this invention provides a non-aqueous product comprising a tetraalkyl silicate or a monomeric or oligomeric hydrolysis product thereof and an inorganic oxide passenger powder below 100 nm diameter, said product being dispersible in a fluid aqueous medium to give the coating composition as defined. These non-aqueous intermediate products are typically solids or doughs; or if fluid are not of application viscosity. We make no claim to coating compositions which are non-aqueous.

This composition is suitable for the pretreatment of solid surfaces such as non-metals and metals generally, including steel, titanium, copper, zinc and, particularly aluminium, which term is used herein to include the pure metal and its alloys. The composition improves the adhesion properties of the pretreated surface, by improving the adhesion thereto of a subsequently applied coating such as paint, varnish, lacquer or adhesive. The pretreatment may improve either the initial adhesion of the subsequently applied coating to the surface or the maintenance of such adhesive properties in service, or both the initial adhesion and maintenance of adhesive properties. For example, so far as subsequently applied adhesive is concerned, the benefits of the invention may be shown mainly not in the initial adhesive strength obtained, but in the maintenance of adhesive strength in hostile or corrosive environments.

Tetraalkyl silicates (or tetraalkoxy silanes) can be progressively hydrolysed to silica according to the following equation:

$$Si(OR)_4 \longrightarrow Si(OR)_3-O-Si(OR)_3 \longrightarrow$$

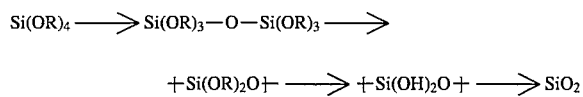

Preferably R in these formulae is ethyl. The unhydrolysed tetraalkylester can be used for this invention, but is not preferred and is indeed preferably absent to reduce volatiles. Preferably the ester is partly hydrolysed to give oligomers. Improved properties may be obtained when at least 90% by weight of the oligomeric hydrolysis product has a molecular weight below 1700. The commercially available silicate 40 is suitable. This component should generally be present in a proportion of 40–80%, preferably 50–70% by weight of the non-volatile content of the composition.

The composition also contains an inorganic oxide passenger powder, for example silica, zirconia, titania or alumina. This may be prepared for example, by comminution or by a vapour phase technique such as flame hydrolysis. The powder has an average particle size below 100 nm and preferably below 50 nm. Powders with this order of particle size not only improve adhesion, but also do so without adversely changing the topography of the substrate.

Fumed silica of particle size below 25 nm down to 7 nm is preferred but fumed titania can also be used. The powder assists in the formation of an insoluble matrix after drying, and is preferably present in the aqueous composition in a proportion of 20–60%, particularly 30–50%, by weight of the nonvolatile content of the composition.

The composition preferably also contains a co-solvent, which helps to wet the surfaces to be coated and also to stabilise the aqueous dispersion. Suitable are polar organic liquids which are at least partly water soluble and preferably volatile, for example mono and polyhydric alcohols and ethers. When used, the co-solvent is preferably present in a proportion of 0.1–30%, particularly 1–10%, by volume on the volume of the whole aqueous composition.

A corrosion-inhibiting constituent may be included, for example a zirco-aluminate or a chromate or organo-metallic trivalent chromium compound, in proportions such as those typically used in metal coating compositions.

Other conventional additives can be used, including silanes and organosiloxanes (which contain Si—C bonds and are distinguished on that account from tetraalkyl silicates).

The composition may also include a catalyst which assists in the chain-extension and cross-linking of the binder in the presence of moisture. The catalyst is used in a concentration to achieve hydrolysis of the tetraalkyl silicate in a convenient time. Suitable catalysts are mineral and organic acids such as nitric and acetic acids or bases such as amines. Free bases are not preferred as they produce formulations which are relatively unstable. Other suitable catalysts are latent catalysts such as salts or complexes of acids and bases which cease to be neutral on their decomposition. An example of a latent catalyst which becomes acidic on decomposition is ammonium acetate. Other suitable catalysts are those which are latent and generate bases on decomposition. An example of a blocked catalyst of this kind is an amine titanate chelate sold under the Trade name Tilcom AT 31 and believed to have the structure I; when the amine is chelated its basicity is reduced. This effect may be enhanced if the amine titanate is further neutralised with acetic acid.

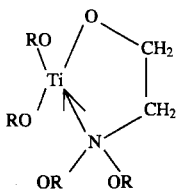

I

Acid peptised sols, such as a zirconium oxide sol peptised in nitric acid, may also be used.

Catalysts are in general not required in the composition of this invention and are preferably omitted. Though also not preferred, it is possible according to the invention to apply a coating composition not containing a catalyst to a surface, and then to apply the catalyst in a subsequent operation to hasten hydrolysis and chain extension of the polysiloxane.

The composition may also include hydrogen peroxide e.g. at a concentration up to 20 g/l. This may be particularly useful when an acid catalyst is used.

Water has a harmful effect on adhesive bonds. Thus components which are hygroscopic or humectant and which act to attract or retain moisture in the coating, are preferably not included in the coating composition.

The coating composition preferably has a pH from 0 to 9, e.g. 1 to 3 and particularly from 1.7– 2.0 in the presence of an acid catalyst and 5–7 in the absence of such a catalyst. If the pH is too high, the emulsion is less stable and the composition has a poor shelf life. If the pH is too low, it may chemically attack the surface to which it is applied.

Tetraalkyl silicates and their partial hydrolysis products are not very stable in neat form, and are generally sold commercially in solution or dispersion in a polar volatile water-miscible organic solvent. In preparing coating compositions according to this invention, a convenient first step is to disperse the passenger powder in the silicate component, which may readily be done by means of a high shear stirrer. A co-solvent, if used, may suitably be added also at this stage. Because of the high surface area of the passenger powder, the resulting intermediate product usually has the consistency of a wet powder or dough, and is only fluid if the liquid content exceeds about 75%. These intermediate products constitute a further aspect of the invention. Preferred products comprise 20 to 50% by weight of the tetraalkyl silicate or hydrolysis product, 10 to 45% by weight of the passenger powder, and 20 to 60% by weight of volatile polar organic liquid at least partly miscible with water. These intermediate products are not stable indefinitely, but have a shelf life typically of several months, sufficient to enable them to be manufactured and distributed for use by a customer.

The coating compositions which form another aspect of this invention may be made by dispersing the intermediate product in a sufficient volume of a fluid aqueous medium to give a convenient application viscosity. The aqueous medium may be water, optionally containing any desired catalyst and any hydrogen peroxide. Other components would generally be included in the intermediate product. The aqueous coating compositions have a rather limited shelf life, of the order of one month, or less if a catalyst is present, and are preferably prepared for immediate use.

It will be understood that these non aqueous intermediate products need not be entirely anhydrous. But the proportion of water should be minor in relation to any organic solvent present, and sufficiently small as not to substantially impair the shelf life of the product by catalysing further hydrolysis of the silicate component.

The surface to which the aqueous composition is to be applied may be cleaned by conventional means appropriate to the substrate concerned. For aluminium this may be an acid or alkaline cleaning treatment, using commercially available chemicals such as those sold by ICI under the Trademark Ridolene 124 and 124E.

The composition may be applied to the surface by a convenient application technique such as roller coating, brushing or spraying. For aluminium strip, roller coating is likely to be an attractive option. The formulation may need to be adjusted to provide a convenient viscosity for application by the desired method. After application and drying, the coating on the surface is cured. Curing temperatures are from ambient up to 400° C., usually (though not always) below those required to fully sinter the inorganic particles, and may typically be in the range of 50°–200° C. With aluminium substrates, preferred curing temperatures are in the range 100°–150° C. Calcination of the coating at temperatures above 400° C. is possible but not usually necessary.

The surface preferably carries the coating at a thickness of 0.01–0.7 μm particularly from 0.05–0.5 μm. It is difficult to apply thicker films satisfactorily by a no-rinse type treatment. The invention envisages as an additional method step the application to the coated surface of an organic coating such as paint, lacquer, varnish or adhesive. There is increasing interest in the use of adhesively bonded aluminium components as structures. The following examples illustrate the invention. Example 1 shows the use of latent catalyst systems. Example 2 shows the use of acid catalysts. Example 3 contains no catalyst except water. Example 4 shows the use of acid catalyst with hydrogen peroxide. Example 5 shows the effect of changing the drying temperature. Examples 6 and 7 show paint systems, on Al and steel respectively. Example 8 shows $Al_2O_3$ as passenger powder. Example 9 shows a different ethyl silicate. All Examples (except 6 and 7) report on adhesive performance, for which the following tests were used.

Joint Preparation and Testing Procedure

Sheets of 1.0 mm gauge 5754-HO and 1.6 mm gauge 5754 H-19 aluminium alloy were vapour degreased with 1,1,1-trichloroethane before cleaning (60s at 60° C.) with a Ridolene 124/120E cleaning composition (supplied by ICI Paints Division. Slough). The various coating solutions were applied to the aluminium sheets by the method of roller coating at a coatweight between 0.1–0.2 g/sqM and dried in an oven, at 130° C. unless otherwise stated.

Two types of joints were made from the thus pretreated sheets, they consisted of:

(i) Lap-shear joints (1.6 mm) consisting of 100 mm×20 mm adherends with an overlap of 10 mm×20 mm, these were bonded with a standard heat-cure single-part structural epoxy adhesive using a bondline thickness of 250 μm, controlled by the addition of 1% ballotini. To accelerate the ingress of moisture three holes of 4 mm diameter were then drilled through the bondline, across the centre of the overlapping area in a manner described by Maddison et al. (Adhesives Vol 7, No. 1, Jan. 1987, 15).

(ii) T-shaped joints (1.0 mm gauge) were constructed from coupons of 110×20 mm, bent to form L shaped adherends and bonded with a standard heat-cure single part structural epoxy adhesive to give T-shaped joints with a 60 mm long bondline.

TESTS

Wet Peel Tests

The T-shaped joints described in (ii) were peeled apart at 5 mm/min on an Instron 6022 tensile tester and the steady state load was recorded during the peel event. In addition, deionised water was sprayed into the opening bondline of the joint throughout the duration of the test.

Salt Spray Test

Lap-shear joints as described in (i) were formed and held at 43° C. in 5% neutral salt spray. The joint strength after exposure was monitored typically after 0, 8, and 20 weeks. Each test consisted of batches of 3 joints to ensure precision. This test is a modification of ASTM B-117.

Joint strength was found by testing in tension at a crosshead displacement rate of 2 mm/min at 21° C. on a Zwick 1474 testing machine and the maximum load or stress recorded.

Stress Humidity Tests

Lap-shear joints as described in (i) were stressed in sets of 6 at stresses of 5 and/or 7 MPa and were exposed to humidity conditions in accordance with BS3900 part F2 i.e. temperature cycling between 42° and 48° C. every 30 minutes; relative humidity nominally 100%.

Performance was measured in terms of days to failure (lifetime) of the stressed joints and the test was deemed to be complete on the failure of 3 out of the 6 joints.

EXAMPLE 1

Latent Catalyst Systems

| Formulation: | |
|---|---|
| (a) Titanium chelate complex (AT31)/acetic acid | |
| Ethyl silicate | (31.0 g) |
| Fumed silica Aerosil 380 | (14.0 g) |
| 1-methoxypropan-2-ol | (21 ml) |
| AT31, alkanolamine titanate | (1% w/w aq +) |
| Acetic acid | (8% w/w aq 188 mls) |
| (b) Triethanolamine acetate | |
| Ethyl silicate | (40.0 g) |
| Aerosil 380 | (8.0 g) |
| 1-methoxypropan-2-ol | (21 ml) |
| Triethanolamine | (1% w/w aq +) |
| Acetic acid | (10% w/w aq 140 ml) |
| (c) Titanium chelate complex (AT31) | |
| Ethyl silicate | (40.0 g) |
| Aerosil 380 | (8.0 g) |
| 1-methoxypropan-2-ol | (21 ml) |
| AT31 | (1% w/w aq 138 ml) |
| (d) Titanium chelate complex (AT31)/fumed titania replaces silica | |
| Ethyl silicate | (40.0 g) |
| Fumed titania, P25 | (8.0 g) |
| 1-methoxypropan-2-ol | (21 ml) |
| AT31 | (1% w/w aq 138 ml) |
| (e) Titanium chelate complex (AT33)/acetic acid | |
| Ethyl silicate | (31.0 g) |
| Aerosil 380 | (14.0 g) |
| 1-methoxypropan-2-ol | (21 ml.) |
| AT33 | (1% w/w aq +) |
| Acetic acid | (8% w/w aq 188 ml) |
| (f) Ethyl silicate | (31.0 g) |
| Aerosil 380 | (14.0 g) |
| 1-methoxypropan-2-ol | (21 ml) |
| AT33 | (1% w/w aq +) |
| Acetic acid | (4% w/w aq 188 ml) |
| (g) Ethyl silicate | (31.0 g) |
| Aerosil 380 | (14.0 g) |
| 1-methoxypropan-2-ol | (21 ml) |
| AT33 | (1% w/w aq +) |
| Acetic acid | (2% w/w aq 188 ml) |

Ethyl silicate was a 40:60 by weight silicate: alcohol product supplied by Thomas Swan & Co. Ltd., Co. Durham, U.K.; Aerosil A380 is fumed silica having a primary particle size of 7 nm supplied by Degussa Ltd., Wllmslow, Cheshire, U.K.; P25 is a titania product having a 21 nm primary size, also sold by Degussa Ltd.; AT31 is an amine titanate chelate of structure I above, sold as a 9.8% (expressed as % by weight titanium) solution in isopropanol by Tioxide International Ltd., Cleveland, U.K.; AT33 is a corresponding product from the same supplier sold as a 7.1% solution in diethylene glycol.

All formulations were mixed in the order shown above before dispersing with a Silverson stirrer and left to age 24 hours prior to application by roller coater. The pretreated metal was then dried at 130° C. for 3 minutes. Joints were made and tested in the manner described previously, the results of the tests are given in Table 1.

A chromate pretreatment "Accomet C" supplied by Albright and Wilson Ltd., U.K. is given as a comparison under the same cleaning and bonding conditions. (1h).

TABLE 1

| CODE | PEEL STRENGTH (N) | LAP-SHEAR STRENGTH (MPa) | NEUTRAL SALT SPRAY (MPa) 20 Weeks | NEUTRAL SALT SPRAY (MPa) 40 Weeks | RESIDUAL STRENGTH (%) | STRESS HUMIDITY LIFETIME (days at 5 MPa) |
|---|---|---|---|---|---|---|
| 1a | 132 | 26.9 | 20.9 | 19.0 | 71 | 266,315,347 |
| 1b | 107 | 28.7 | 18.1 | 13.3 | 46 | 68,119,139 |
| 1c | 70 | 29.4 | 18.6 | 9.0 | 31 | 116,148,153 |
| 1d | 75 | 28.9 | 17.6 | 12.6 | 44 | 141,144,193 |
| 1e | — | 28.3 | 14.3 | @ | | 82,>138 |
| 1f | — | 27.3 | 10.1 | @ | | >138 |
| 1g | — | 28.4 | 5.5 | @ | | 64,>138 |
| 1h | — | 28.7 | 23.0 | 16.7 | 58 | 75,92,126 |

@ Awaiting results.

EXAMPLE 2

Acidic Catalysts (a) Zirconia Sol (peptised with nitric acid)

Formulation:

| | |
|---|---|
| Ethyl silicate | (40.0 g) |
| Aerosil 380 | (14.0 g) |
| 1-methoxypropan-2-ol | (21 ml) |
| Zirconia sol (pH 1.7) | (1.5% w/w aq 138 ml) |

Formulations:

(b)
| | |
|---|---|
| Ethyl silicate | (31.5 g) |
| Aerosil 380 | (14.0 g) |
| 1-methoxypropan-2-ol | (21 ml) |
| Zirconia sol (pH 1.7) | (1.5% w/w aq 138 ml) |

(c)
| | |
|---|---|
| Ethyl silicate | (40.0 g) |
| Aerosil 380 | (8.0 g) |
| 1-methoxypropan-2-ol | (21 ml) |
| Zirconia sol (pH 1.7) | (1.5% w/w aq 138 ml) |

(d)
| | |
|---|---|
| Ethyl silicate | (40.0 g) |
| Aerosil 380 | (14.0 g) |
| 1-methoxypropan-2-ol | (21 ml) |
| Zirconia sol (pH 1.7) | (1.5% w/w aq 138 ml) |

(k)
| | |
|---|---|
| Ethyl silicate | (35.0 g) |
| Glycidoxypropyl trimethoxy silane | (5.0 g) |
| Aerosil 380 | (8.0 g) |
| 1-methoxypropan-2-ol | (21 ml) |
| Zirconia Sol | (1.5% v/v aq 138 ml) |

Acid Formulations:

(e)
| | |
|---|---|
| Ethyl silicate | (40.0 g) |
| Aerosil 380 | (8.0 g) |
| 1-methoxypropan-2-ol | (21 ml) |
| Acetic Acid (pH 2.5) | (10% w/w aq 138 ml) |

(f)
| | |
|---|---|
| Ethyl silicate | (40.0 g) |
| Aerosil 380 | (14.0 g) |
| 1-methoxypropan-2-ol | (21 ml) |
| Acetic Acid (pH 2.5) | (10% w/w aq 138 ml) |

(g)
| | |
|---|---|
| Ethyl silicate | (31.0 g) |
| Aerosil 380 | (14.0 g) |
| 1-methoxypropan-2-ol | (21 ml.) |
| Acetic Acid (pH 2.5) | (10% w/w aq 138 ml) |

(h)
| | |
|---|---|
| Ethyl silicate | (40.0 g) |
| Aerosil 380 | (14.0 g) |
| 1-methoxypropan-2-ol | (21 ml) |
| Nitric Acid (pH 1) | (2% v/v aq 138 ml) |

(i)
| | |
|---|---|
| Ethyl silicate | (40.0 g) |
| Aerosil 380 | (8.0 g) |
| 1-methoxypropan-2-ol | (21 ml) |
| Nitric Acid (pH 1) | (2% v/v aq 138 ml) |

(j)
| | |
|---|---|
| Ethyl silicate | (119 g) |
| Aerosil 380 | (24 g) |
| 1-methoxypropan-2-ol | (64 ml) |
| Nitric Acid (pH 1) | (8% v/v aq 414 ml) |

(b, c and d) Zriconia sol catalyst with varying silica/siloxane ratio.
N.B. These pretreatments were dried at 180° C. using ethyl silicate supplied by Union Carbide U.K. Ltd., Rickmansworth, Herts. Joints were made with a different batch of adhesive than that used in (a).

All formulations were applied as described in Example 1 with the exception of b, c and d which were dried at 180° C. and are used to exemplify the effect of variation in the siloxane/silica ratio for the zirconia sol catalysed systems at this elevated drying temperature; a comparison chromate coating used under the same conditions of elevated drying temperature was also performed. (ACCc).

The results for the coatings are given in Table 2.

TABLE 2

| CODE | PEEL STRENGTH (N) | LAP-SHEAR STRENGTH (MPa) | NEUTRAL SALT SPRAY (MPa) 20 Weeks | 40 Weeks | RESIDUAL STRENGTH (%) | STRESS HUMIDITY LIFETIME (days at 5 MPa) |
|---|---|---|---|---|---|---|
| 2a | 144 | 28.5 | 14.9 | 12.2 | 43 | 168,178,179 |
| 2e | 145 | 27.2 | 14.9 | 18.5 | 68 | 88,102,105 |
| 2f | 151 | 29.4 | 19.9 | 14.1 | 48 | >510 |
| 2g | 146 | 27.3 | 13.6 | 16.3 | 60 | 385,404,>510 |
| 2h | 78 | 29.6 | 17.9 | 16.1 | 60 | 50,53,60 |
| 2i | 104 | 28.6 | 14.8 | 9.9 | 35 | 56,60,74 |
| 2j | 79 | 27.6 | 5.9 | £ | 21 | E |
| | | (Higher drying temperature of 180° C. employed for b, c and d below.) | | | | |
| 2b | 137 | 27.9 | 21.3 | E | 76 | 67 |
| 2c | 122 | 27.5 | 21.6 | £ | 79 | 63,96,96 |
| 2d | 111 | 28.5 | 20.7 | £ | 72 | |
| 2k | £ | 27.5 | £ | £ | £ | |
| ACCc | 124 | 28.8 | 19.7 | £ | 68 | 72 |

£ not tested

Sets e, f, g and h, i show the effect of varying the siloxane/silica ratio for acetic acid and nitric acid catalysts respectively at a drying temperature of 130° C.

Set j shows the effect of over-catalysis on the system using 8% nitric acid.

Set 2k shows the use of a silane.

EXAMPLE 3

Water as Catalyst

| Formulations: | | |
|---|---|---|
| (a) Ethyl silicate | (31.0 g) | |
| Aerosil 380 | (14.0 g) | |
| 1-methoxypropan-2-ol | (22 ml) | |
| Deionised Water | (138 ml) | |
| (b) Ethyl silicate | (40.0 g) | |
| Aerosil 380 | (8.0 g) | |
| 1-methoxypropan-2-ol | (22 ml) | |
| Deionised Water | (138 ml) | |

-continued

| Formulations: | | |
|---|---|---|
| (c) Ethyl silicate | (40.0 g) | |
| Aerosil 380 | (14.0 g) | |
| 1-methoxypropan-2-ol | (22 ml) | |
| Deionised Water | (138 ml) | |
| (d) Ethyl silicate | (31.0 g) | |
| Aerosil 380 | (14.0 g) | |
| Dowanol TPM | (22 ml) | |
| Deionised Water | (138 ml) | |
| (e) Ethyl silicate | (31.0 g) | |
| Aerosil 380 | (14.0 g) | |
| Dowanol PnB | (22 ml) | |
| Deionised Water | (190 ml) | |

Dowanol TPM is tripropyleneglycol monomethyl ether.
Dowanol PnB is propylene glycol monobutyl ether.

All formulations were applied and tested as outlined in Example 1, the results are shown in Table 3. In addition a further test was performed on 3a which involved storage of pretreated alloy in a humidity cabinet at 95% relative humidity and 25° C. for a period of 8 weeks prior to the salt spray test (as described previously) being carried out.

TABLE 3

| CODE | PEEL STRENGTH (N) | LAP-SHEAR STRENGTH (MPa) | NEUTRAL SALT SPRAY (MPa) 20 Weeks | 40 Weeks | RESIDUAL STRENGTH (%) | STRESS HUMIDITY LIFETIME (days at 5 MPa) |
|---|---|---|---|---|---|---|
| 3a | 152 | 29.2 | 22.4 | 20.6 | 71 | >510 |
| 3b | 153 | 29.0 | 21.8 | 21.0 | 72 | 100,>510 |
| 3c | 151 | 28.7 | 22.4 | 20.5 | 71 | 162,288,>510 |
| 3a 8w storage | | 28.6 | 18.3 | 18.6 | 64 | — |
| 3d | — | 27.6 | 21.5 | 22.7 | 82 | 105,175,>260 |
| 3e | — | 28.5 | 12.0 | @ | 42 | >196 |

These are good results for chromate-free systems. A chromium-containing system was also formulated:

| | | |
|---|---|---|
| (f) | Ethyl silicate | (31.0 g) |
| | Aerosil 380 | (14.0 g) |
| | Dowanol TPM | (22 ml) |
| | Chromium trioxide | (1 g in 20 ml water) |
| | Deionised Water | (138 ml) |

The lap shear strength obtained using this formulation was 27.2 MPa.

EXAMPLE 4

Acid Catalyst with Hydrogen Peroxide

| Formulations: | |
|---|---|
| (a) Ethyl silicate | (31.0 g) |
| Aerosil 380 | (14.0 g) |
| 1-methoxypropan-2-ol | (21 ml) |
| Zirconia sol | (1.5% w/v aq 138 ml) |
| Hydrogen peroxide (pH 1.7) | (35% w/v aq 0.8 g) |
| (b) Ethyl silicate | (40.0 g) |
| Aerosil 380 | (14.0 g) |
| 1-methoxypropan-2-ol | (21 ml) |
| Zirconia sol | (1.5% w/v aq 138 ml) |
| Hydrogen peroxide (pH 1.7) | (35% w/v aq 0.9 g) |
| (c) Ethyl silicate | (31.0 g) |
| Aerosil 380 | (14.0 g) |
| 1-methoxypropan-2-ol | (21 ml) |
| Zirconia sol | (1.5% w/v aq 138 ml) |
| Hydrogen peroxide (pH 1.7) | (35% W/v aq 1.0 g) |

All coatings were applied as described in Example 1, however the drying temperatures employed for the pretreatments b and c were 180° C. The results are given in Table 4.

TABLE 4

| CODE | PEEL STRENGTH (N) | LAP-SHEAR STRENGTH (MPa) | NEUTRAL SALT SPRAY (MPa) | | RESIDUAL STRENGTH (%) | STRESS HUMIDITY LIFETIME |
|---|---|---|---|---|---|---|
| | | | 20 Weeks | 40 Weeks | | |
| | | | | | | (days at 5 MPa) |
| 4a | 134 | 29.2 | 20.0 | | 68 | 132 |
| | | | | | | (days at 7 MPa) |
| 4b | 152 | 28.4 | 19.8 | 15.7 | 55 | 57,58,63 |
| 4c | 151 | 29.0 | 20.3 | 17.7 | 61 | 66,71,72 |

EXAMPLE 5

Effect of Coating Drying Temperature Using Zirconia Sol As Catalyst

A comparison of drying temperatures for formulation 2a (see Example 2) is given in Table 5.

TABLE 5

| TEMP | PEEL STRENGTH (N) | LAP-SHEAR STRENGTH (MPa) | NEUTRAL SALT SPRAY (MPa) | | RESIDUAL STRENGTH (%) | STRESS HUMIDITY LIFETIME (days at 5 MPa) |
|---|---|---|---|---|---|---|
| | | | 20 Weeks | 40 Weeks | | |
| 100 | 155 | 28.0 | 20.1 | 18.6 | 67 | 68,83,105 |
| 180 | 151 | 29.4 | 18.3 | 15.0 | 51 | 55,62,63 |

EXAMPLE 6

Tests on Paint Adhesion on Aluminium

Accomet C and the siloxane (Example 3, formulation d) were both coated at approx. 200 mg/m$^2$ dry coatweight on sheets of acid-cleaned aluminium (alloy 5754) and the pretreated panels were coated with a white thermosetting polyester. After drying at the recommended temperature of 220° C., the adhesion of the paint was tested by scribing through the paint layer to the substrate underneath with a cross-hatch cutter, and attempting to lift the paint with sellotape. The panels were then boiled in water for 60 minutes and the tape lift-off test repeated (BS 6497: 1984 Sections 10.6 and 16.2 modified).

Both pretreatments gave equally good results; the paint was not removed from the substrate.

EXAMPLE 7

Tests on Paint Adhesion on Steel

Accomet C and the siloxane (Example 3, formulation d) were both coated at approx. 200 mg/m$^2$ dry coatweight on sheets of grit-blasted and solvent-cleaned steel (1.2 mm) and the pretreated panels were coated with a white thermosetting polyester. After drying at the recommended temperature of 220° C., the adhesion of the paint was tested by scribing through the paint layer to the substrate underneath with a cross-hatch cutter, and attempting to lift the paint with sellotape. The panels were then boiled in water for 60 minutes and the tape lift-off test repeated.

Again, the paint was not removed from the substrate in either case.

EXAMPLE 8

Tests Using Aluminium Oxide as Passenger Powder to Replace Silica

Flame hydrolysed alumina: Aluminium Oxide C (13 nm primary particle size) supplied by Degussa, Cheshire, U.K.

| Formulation: | |
|---|---|
| Ethyl silicate | 31 g |
| Alumina | 14 g |
| Dowanol TPM | 22 ml |
| Deionised water | 138 ml |

The formulation was applied to Al alloy sheets and the pretreatment was dried at 130° C. for three minutes in the usual way. Joints were prepared for long term testing.

Initial lap shear strengths were promising: 28.8 MPa.

EXAMPLE 9

Examples of lower molecular weight ethyl silicates which consist predominantly of the monomer tetraethoxyorthosilicate (TEOS) are given below. Both are acid catalysed, the latter with a latent acid catalyst:

| (a) Condensed Silicate | 59.9 g |
|---|---|
| Aerosil 380 | 8.1 g |
| Acetic acid (10% w/w aq.) | 140 ml |

Condensed Silicate is supplied by Union Carbide, U.K. and consists predominantly of TEOS.
Peel strength 142 N.
Stress Humidity 5 MPa 70, 73, 76 days to failure.
Neutral salt spray (MPa)

| 0 Weeks | 8 weeks | 20 weeks | 40 weeks |
|---|---|---|---|
| 28.7 | 16.8 | 15.4 | not tested |

| (b) TEOS | 48 g |
|---|---|
| Aerosil 380 | 14 g |
| Dowanol TPM | 22 ml |
| AT31 | (1% w/w aq + |
| Acetic Acid | 8% w/w aq 188 ml) |

TEOS is commercially available from several sources.
Peel strength 109 N.
Neutral salt spray (MPa)

| 0 Weeks | 8 weeks | 20 weeks | 40 weeks |
|---|---|---|---|
| 22.9 | 16.9 | 15.8 | 12.6 |

We claim:
1. A coating composition suitable for application to a surface to improve the adhesion properties of the surface, said coating composition consisting essentially of a binder which is a tetraalkyl silicate or a monomeric or oligomeric hydrolysis product thereof, an inorganic oxide below 100 nm primary particle diameter, and optionally at least one component selected from the group consisting of corrosion-inhibitors, surfactants, adhesion-promoters, markers, catalysts for chain-extension and cross-linking of the binder, and hydrogen peroxide, all in dispersion in a fluid aqueous medium consisting of water containing up to 30 % by volume of a polar organic liquid at least partially miscible with water.

2. A composition as claimed in claim 1, wherein the inorganic oxide is below 25 nm primary particle diameter and is present in a proportion of 30–60% by weight of the non volatile content of the composition.

3. A composition as claimed in claim 1, wherein the inorganic oxide is fumed silica.

4. A composition as claimed in claim 1, wherein the oligomeric hydrolysis product is a polydialkyl siloxane and is present in a proportion of 40–70% by weight of the non-volatile content of the composition.

5. A composition as claimed in claim 1, wherein said tetraalloyl silicate or monomeric or oligomeric hydrolysis product thereof is there an oligomeric partial hydrolysis product of tetraethyl silicate.

6. A composition as claimed in claim 1, wherein from 0.1–30% by volume of a polar organic liquid at least partly miscible with water is also present.

7. A method of pretreating an aluminium workpiece, which method comprises applying to surface of the workpiece a coating composition according to claim 1, and drying the coating.

8. A non-aqueous product consisting essentially of a binder which is a tetraalkyl silicate or a monomeric or oligomeric hydrolysis product thereof, an inorganic oxide below 100 nm primary particle diameter, and optionally at least one component selected from the group consisting of corrosion inhibitors, surfactants, adhesion-promoters, markers, catalysts for chain-extension and cross-linking of the binder and hydrogen peroxide, said product being dispersible in a fluid aqueous medium consisting of water containing up to 30% by volume of a polar organic liquid at least partially miscible with water, to give a coating composition suitable for application to a surface to improve the adhesion properties of the surface.

9. A product as claimed in claim 8, compirsing 20-50% by weight of the tetraalkyl silicate or hydrolysis product, 10–45% by weight of the inorganic oxide, and 20–60% by weight of volatile polar organic liquid at least partly miscible with water.

10. An aluminium workpiece carrying a surface coating formed by the method of claim 9 and adhesive overlying the surface coating.

11. An aluminium workpiece carrying a surface coating formed by the method of claim 9, and adhesive overlyhing the surface coating.

11. A plurality of aluminium workpieces according to claim 11 secured together by the adhesive.

* * * * *